United States Patent [19]

Maben

[11] Patent Number: 4,476,905

[45] Date of Patent: Oct. 16, 1984

[54] RIBBON CABLE WIRE END FORMING TOOL

[75] Inventor: Duane K. Maben, Clear Lake, Iowa

[73] Assignee: Sperry Corporation, New York, N.Y.

[21] Appl. No.: 526,509

[22] Filed: Aug. 25, 1983

Related U.S. Application Data

[63] Continuation of Ser. No. 268,048, May 28, 1981, abandoned.

[51] Int. Cl.$^3$ .............................................. B21F 1/00
[52] U.S. Cl. ..................................... 140/105; 72/478; 29/566.3; 29/749; 29/861
[58] Field of Search ...................... 140/1, 105; 72/385, 72/473, 478, 41, 42; 83/640, 641; 81/9.51; 29/748, 749, 857, 861, 862, 863, 566, 566.1, 566.2, 566.3; 199/50, 51

[56] References Cited

U.S. PATENT DOCUMENTS

| | | | |
|---|---|---|---|
| 565,515 | 8/1896 | Scudder | 199/51 |
| 676,306 | 6/1901 | Fletcher | 199/51 |
| 3,741,261 | 6/1973 | Windsor et al. | 140/1 |

FOREIGN PATENT DOCUMENTS 7506800 12/1976 Netherlands .......................... 29/748

Primary Examiner—Francis S. Husar
Assistant Examiner—Linda McLaughlin
Attorney, Agent, or Firm—William C. Fuess; Kenneth T. Grace; Marshall M. Truex

[57] ABSTRACT

A cyclical machine forming tool utilizes positionally justified form knives so that, nominally, a selected 80 out of 120 total stripped wire ends of flat ribbon cable may be selectively simultaneously formed, for bent, into a contour such as is useful for soldered attachement to printed circuit cards. Positional justification of wire-forming hammer elements called form knives, nominally 41 in number, across a variable distance, nominally 1.676±0.009 inches, is expediently repetitively accurately accomplished by wedging them apart with interspersed counterposed knife elements, nominally 40 in number, called adjuster knives. Two such tools may be deployed back to back in staged sequence with other ribbon cable positioning, clamping, severing, and end stripping elements so that a multi-conductor flat ribbon cable may be severed at a desired length, have conductors stripped of insulation on both severed ends, and have stripped conductor wires of both ends selectively formed in an efficient semi-automated process.

5 Claims, 8 Drawing Figures

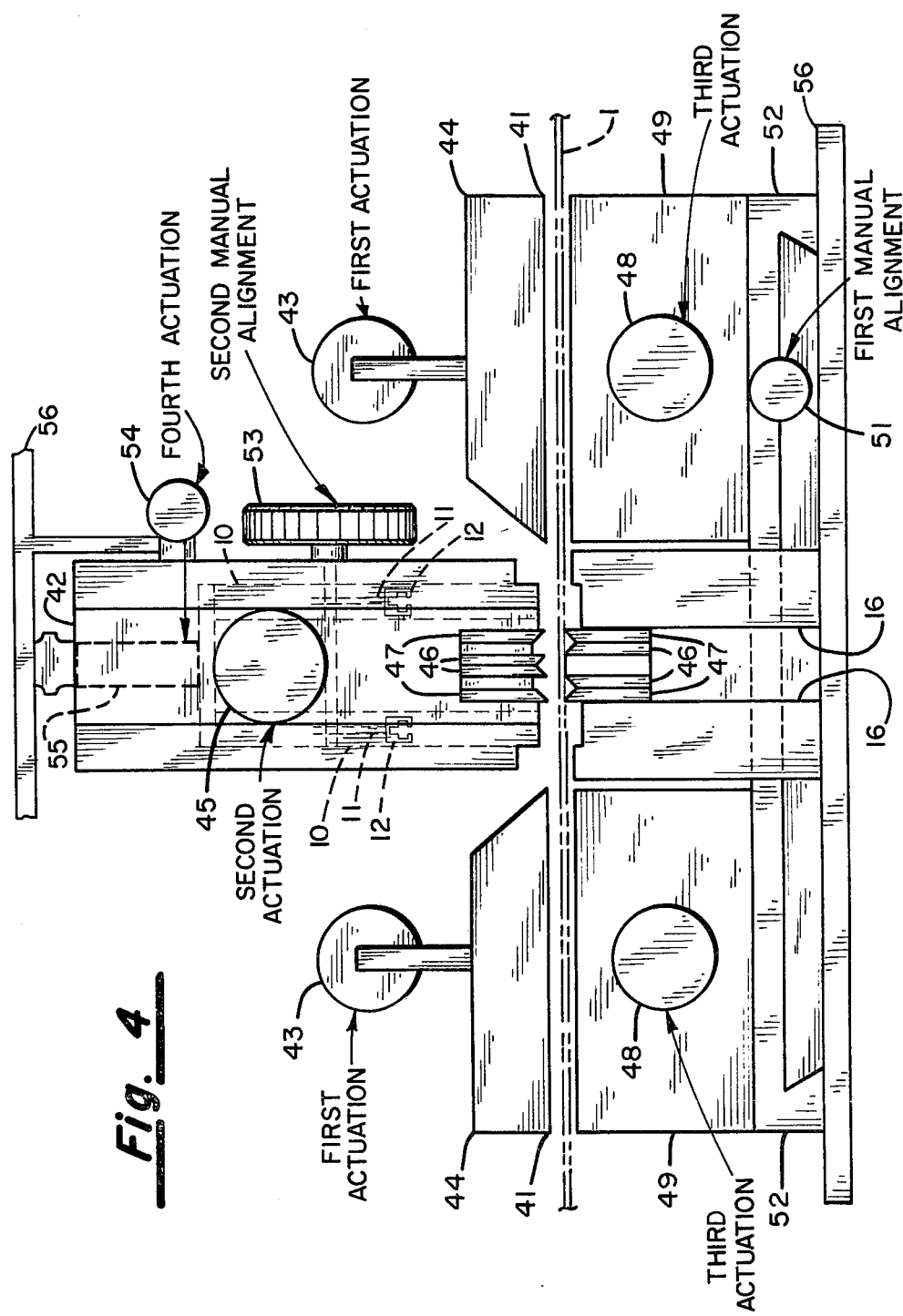

RIBBON CABLE WIRE END FORMING TOOL

This is a continuation of application Ser. No. 268,048, filed May 28, 1981, abandoned Aug. 26, 1983.

BACKGROUND OF THE INVENTION

Multi-wire conductor flat ribbon cable is an electrical interconnection economical in cost, space and weight. It is in widespread usage in digital computer systems wherein the multiple conductors of a stripped cable end are soldered directly onto a printed circuit board. To improve the density of the ribbon cable and the associated interconnects to printed circuit lands, small wires are very close together—on the order of 0.0050 inches separation between 0.0095 inches diameter wire conductors. At such densities some stripped conductors of the ribbon cable are often displaceably formed, or bent, into positions above and/or below the plane of the ribbon cable. Such displaced positions permit lower, workable, densities when the wire ends are connected to printed circuit boards.

The most basic and straightforward method of preparing such a ribbon cable end is as follows. The cable is cut to the desired length with the ends square. The insulation is stripped from the conductors about 0.125 inch using a carpenters type wire stripper or the like. The wire ends are individually formed, as selectively desired, by manually aligning each selected conductor between a forming hammer and an anvil form block and individually displaceably forming it as by a manual stroke.

The basic method of end forming the conductors individually, or at most in small groups much less than the total ribbon cable width of 80 or more conductors, is resistant to being improved upon by a solid comb type multiconductor simultaneous forming tool because of tolerance problems. The tolerance problem is that, because the conductor wires are not spaced with exact consistency within the cable and because the width of the cable from first wire to last wire may vary, if a single conductor wire is precisely positioned over a single position of a multiple position simultaneous forming tool then a remote conductor wire, due to spacing variations, will not be in correct position to be controllably correctly formed. In other words, the industry standard workpiece ribbon cable exhibits greater variation across its width than can be tolerated by a solid comb type multiconductor simultaneous forming tool otherwise capable of forming fine conductors at close proximity.

An example of the tolerance problem is that occuring in end forming of a flat ribbon cable of 120 conductor wires of nominal 0.0095 inches diameter and at a nominal spacing of 0.0045 inches between wires. A flat ribbon cable of 120 such wires separated by 119 such spaces would thereby total 1.676 inches from the centerline of the first to the centerline of the last conductor wire. Actual measurements show that this nominal width of 1.676 inches will vary by ±0.009 inches. Such a deviation of less than 1% and less than 0.01 of an inch is not surprising for a cable mass produced by the mile. If it is desired to capture the individual wires between the teeth of a comb type block and anvil forming tool so that they may be selectively formed, the teeth must penetrate within the 0.0045 inch spaces. If a first space tooth is exactly centered, the 119th space tooth will not reliably fall into the space between the 119th and 120th wires. If no attempt to separate and guide the conductors is made, as by using only a flat anvil with serration spaces for those selected conductors not to be formed, the problem still exists.

During the explanation of the present inventive solution to this problem, it will be seen that a mechanical device involving two sets of knives will be disclosed as an apparatus for evenly dividing an interval of undetermined and variable length. Prior art utilization of one set of knives exists in a linotype machine. When typeset words, which represent several lengths, are formed across a line of fixed length then the spaces between all such word lengths may be evenly adjusted by forcing separator knives evenly between such word lengths. For example, three knives may be evenly forced into the three spaces between four words on a typeset line in order to effectuate even separation. This function of a knife edge to effectuate even separation will become obvious as the present invention is discussed.

These prior art linotype machine knives will be seen to differ from the present invention which utilizes two intermeshing sets of knives, not one set.

The function of the present invention is to divide and partition into various integral multiples of even parts an overall interval of undetermined and variable length, not to evenly separate variable lengths along a fixed interval.

SUMMARY OF THE INVENTION

The present invention utilizes a justifying type form comb tool wherein movable forming elements, called form knives, can be accurately positioned over, and subsequently correctlty form, the selected conductors during forming of the stripped wire ends of a flat ribbon cable. The form knives are particularly shaped hammer elements (the part which is movable relative to a fixed anvil form block) arrayed across the width of the ribbon cable. In the preferred embodiment 41 identical sequential form knives are utilized to contact 39 pairs (78 wires) and 2 end wires of a 120 wire ribbon cable. The 80 wires so contacted are formed, and 40 wires are left straight. The principle of the invention will be seen to permit other sizes and combinations. The form knives are intially constrained to move normal to the plane of the ribbon cable (the "Z" axis) and always constrained from movement along the length of the ribbon cable (the long axis of the plane of the flat ribbon cable or "X" axis). The entire sequential array of form knives and the form knives individually can be, within constraints, moved across the width of the ribbon cable (the short axis of the plane of the flat ribbon cable, or "Y" axis). A first forming knife is manually visually positioned over an edge conductor of the ribbon cable. All remaining forming knives are adjusted to be evenly staged along the width of the ribbon cable, and correctly positioned over the wires (wire pairs) which will be formed, by a single control operating in conjunction with tapered wedges, called adjuster knives, interspersed between all form knives. In the preferred embodiment there are 40 adjuster knives evenly interspersed between the 41 form knives. The linear array of form and adjuster knives are under compressive spring pressure. The adjuster knives are controllably forced as wedges between the form knives to separate the form knives against the spring pressure. When the end, or last, forming knife is controllably positioned over the opposite edge conductor of the ribbon cable then all of the form knives in the linear array will be evenly separated across the width of, and atop the wire conductors of, the flat ribbon cable. When the entire form knife array is subsequently lowered in a hammering stroke the individual knives will simultaneously form, or bend, the wires thereunder.

In the preferred embodiment of the invention 38 of the 40 total form knives will be used to form, or bend, two conductor wires each. This double wire forming per single knife is purely a function of the type of ribbon cable ends which are being prepared—mainly, a succession of two wires formed followed by a two wires straight, or unformed. The invention can employ form knives sufficient to contact and form the wires individually. If a form knife is truncated in its physical length such that it cannot contact the individual wire(s) disposed thereunder, then that positional places(s) in the linear array of form knives will be held but no wire forming will transpire at that location. An improvement to the wire contacting heads of the form knives is also possible. If such heads are concave, or grooved, along the axis of the wire conductors ("X" axis) then they will capture and guide the wires with greater certainty during the forming operation. This is useful if the wires are not spaced consistantly across the width of the ribbon cable.

The summary effect of the invention is to create a forming tool with a forming head which is justified, or arranged, to besuit the exact spacing of flat ribbon cable multiple wire conductor ends which are being formed. This justification is necessary because the variations in the total dispersion of conductors across the width of such ribbon cable are greater than will permit a single solid forming head to accurately contact and simultaneously form all wires at all locations. The present invention utilizes tapered adjustable knives so that the justified forming head may quickly, simply, accurately, and reusably be configured, used and reconfigured.

It is a first object of the present invention to show the apparatus of a justifying type multiconductor ribbon cable wire end forming tool and the method of using such tool.

It is a second object of the present invention to show an improved, concave, hammer head on the forming elements which improves the reliability of contact with each of one or more wires to be formed by such forming element.

It is a third object of the present invention to show an apparatus and method for the semiautomated cutting, stripping, and end forming of multi-conductor ribbon cable.

It is a fourth object of the present invention to show an apparatus and method whereby successive intervals of unmeasured and variable length may be readily repetitively divided into successive sequential segments each of which is in length an integral multiple of a common fraction 1/N of the total interval length. This mechanical method of partitioning a length will physically locate N+1 identically wedge edged movable elements, called form knives, at positions physically demarking N even segments, or subintervals, along the total interval length. The position demarking elements, called form knives, can be modified by truncation, sharpening, pointing, or the like to adaptively demark segments commencing at a certain integral fraction of the total interval length. For example, the variable interval parititioning apparatus and method which is the fourth object of this invention will readily repetitively allow a segment commencing at 23/40 of an interval length and running for 9/40 along that interval to be located and, with suitable shaping of the heads of the form knife demarking elements, marked as in the formation of a rule or scale.

BRIEF DESCRIPTION OF THE DRAWINGS

FIG. 4 shows a side view of two back to back ribbon cable form tools including forming heads plus anvil forming blocks in conjunction with a ribbon cable handling fixture, such combination as comprises multiconductor flat ribbon cable cutting, stripping, and end forming tool.

DESCRIPTION OF THE PREFERRED EMBODIMENT

Figures 1A, 1B:
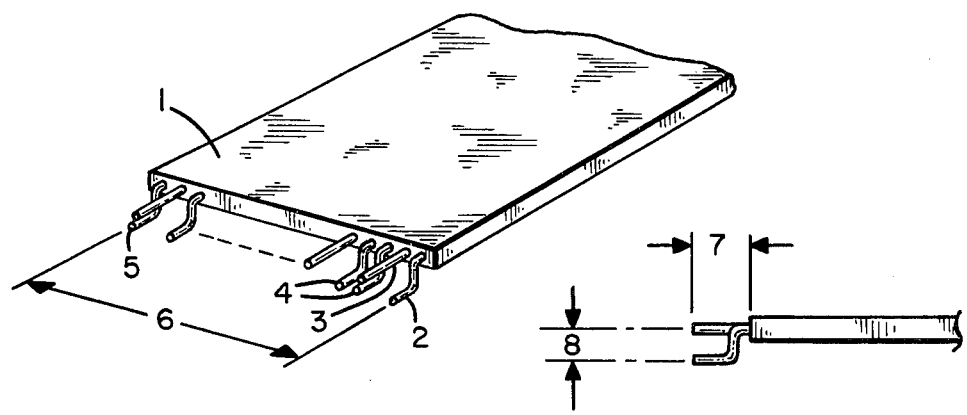
FIG. 1a shows the flat ribbon cable workpiece.
FIG. 1b shows a side view of the workpiece in order that the dimensions of the formed wires may be observed.

The present invention of a ribbon cable form tool operates on a flat ribbon cable workpiece as shown in FIGS. 1a and 1b. The ribbon cable 1 nominally contains 120 wire conductors of 0.0095 inches diameter each at a separation of approximately 0.0050 inches between conductors. The total distance from the centerline of the first to the centerline of the last conductor is dimension 6 of 1.676±0.009 inches, with the ±0.009 inches tolerance due to normal variations in manufacture. The workpiece ribbon cable 1 is shown in its stripped and formed condition wherein the stripped length 7 is approximately 0.125 inches and the displacement 8 of the wires when formed is approximately 0.062 inches below the plane of the ribbon cable. All these dimensions are shown and discussed not as limitations on the performance of the present invention, but quite the opposite, as indices of the fine dimensions and tight tolerance within which it will accurately perform.

The arbitrary forming which is impressed upon the workpiece ribbon cable by the preferred embodiment invention is shown in FIG. 1a. The first wire 2 and the last wire 5, or 120th conductor, are formed below the plane of the ribbon cable. Interior of these edge connectors there are alternate single straight wires, such as straight wire 3, and formed pairs, such as formed pair 4. Thus the arbitrary configuration formed will consist of two formed single edge wires, forty straight wires, and thirty-nine formed pairs. It may thus be considered that forming transpires in forty-one (two edge plus thirty-nine interior) equally spaced locations. The preferred embodiment of the invention to be discussed in conjunction with FIG. 2 will so form at forty-one equally spaced locations. As will become obvious, however, this arbitrary configuration is not integral to the present invention. Specifically, the following should be kept in mind as the invention is discussed. The end conductors need not be formed. The conductors need not be formed by pairs, but may be individually formed. Forming need not be symmetrical and regular across the width of the flat ribbon cable—there may be selectively unformed individual conductors up to entire sections of the cable. All such selectable forming will be controlled by a hammer element within the present invention called a form knife.

Figure 2:
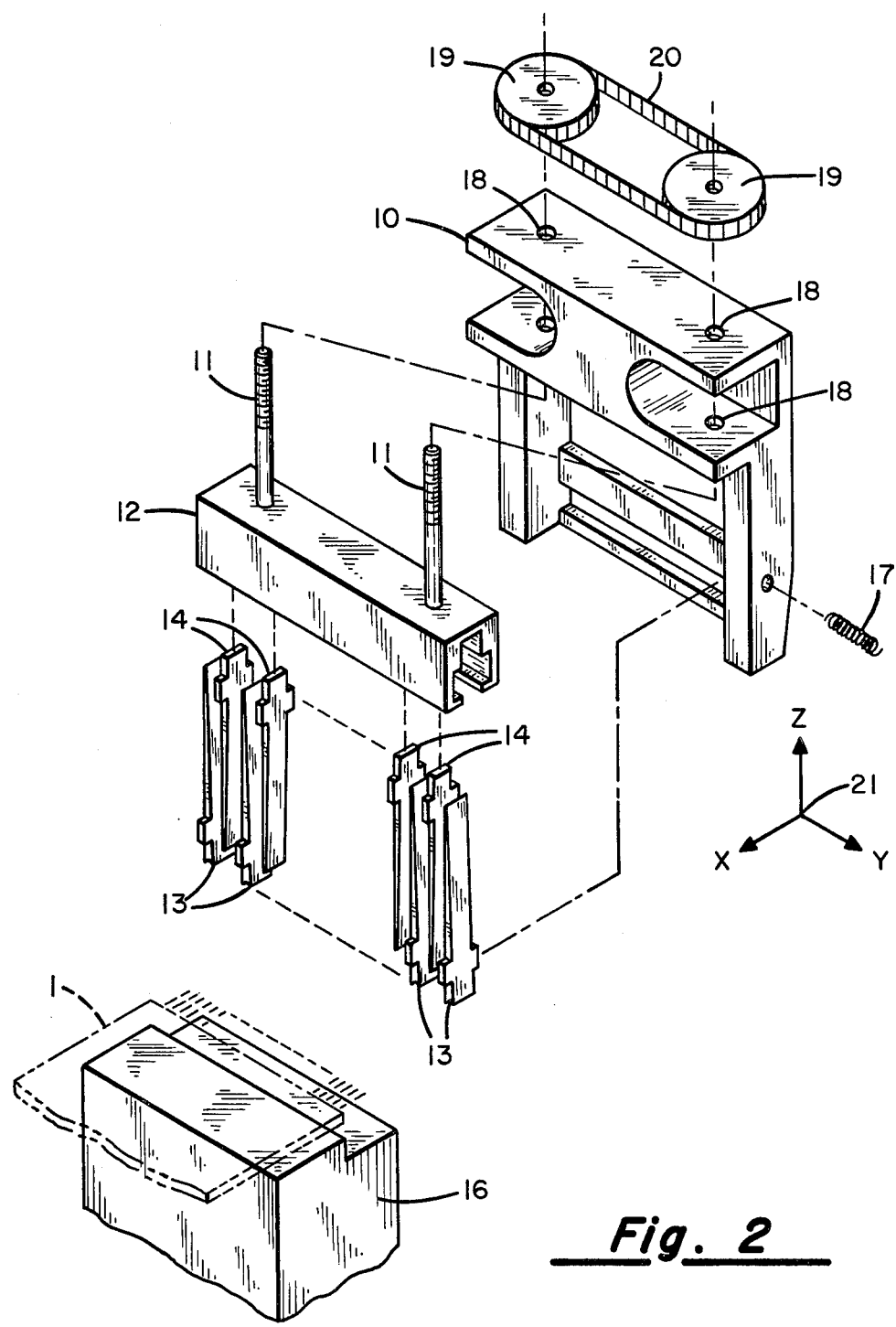
FIG. 2 shows the ribbon cable form tool forming head of the present invention.

The present invention of a ribbon cable form tool is shown in FIG. 2. The three orthogonal axis of the diagram are represented as X, Y and Z in axis indicator 21. The form head housing 10 supports the entire form head apparatus and, during the hammering or forming operation, maintains a fixed relationship directly above (the Z axis) the anvil, or form block 16. The channel lift assembly 12 is raised or lowered in the Z axis by the threaded rods 11. It does not matter whether the blocks connecting channel lift assembly 12 to threaded rods 11 are traveling or fixed. In the preferred embodiment channel life assembly 12 remains disposed at the lower ends of rotatable threaded rods 11 and the rods themselves are moved up and down within form head housing 10 due to rotation of internally threaded chain sprocket wheels 19.

The channel lift assembly 12 contains forty adjuster knives 14. Momentarily referring to FIG. 3a and 3b, the typical construction of knife 30, which may be either one of adjuster knives 14 or form knives 13 as shown in FIG. 2, may be observed. Each knife 30 has tabs 31. Returning to FIG. 2, the tabs on the adjuster knives 14 and the walls of the channel lift assembly 12 constrain these knives from movement in the X axis direction. They may be moved in the Z axis direction by raising and lowering channel lift assembly 12 within which they are held. The adjuster knives 14 can slide in the Y axis direction within channel lift assembly 12. A spring, not shown, may be inserted within one end of channel lift assembly 12, if desired, to biasedly compress the adjuster knives 14 toward one end of channel lift assembly 12. The number of adjuster knives 14—forty—is determined by the number of intervals between form knives 13.

The form knives 13 are the hammer elements which will contact at their lower heads the workpiece ribbon cable 15 to form the conductors therein against anvil form block 16. Momentarily referring to FIGS. 3a and 3b, the knife 30 shown is of the typical construction of one of the form knives 13. The tabs 31 of form knives 13 are held within a Y axis channel within form head housing 10, shown in FIG. 2. They are constrained from movement relative to the form head housing 10 in the Z axis and also in the X axis by a cover plate, not shown, such as completes the other side of the constraining channel in a symmetrical manner to the side shown. The form knives 13 can slide along the Y axis within their constraining channel within form head housing 10. They are biased in this Y axis degree motional freedom by a spring 17 which compresses the form knives 13 toward one end of their constraining channel.

There are forty-one form knives 13 in the preferred embodiment which are separated by the forty adjuster knives 14. Both components have knife blade type wedge edges which are sliding contact. An interval dividing operation which will space the form knives 13 evenly across a variable interval, such as the width of the ribbon cable 1, is performed as follows. Recall that the form knives 13 are captivated in a covered channel of form head housing 13 wherein their only degree of freedom is along the Y axis. Recall also that the adjuster knives 14 are captivated by the channel lift assembly 12 and can slide along the Y axis while they are moved in the Z axis through movement of the channel lift assembly 12. The spring 17 forces all knives against each other and against the ends of their respective channels. Vertical, Z axis, movement of channel lift assembly 12 is obtained by rotating threaded rods 11. This rotation is obtained by rotating internally threaded chain sprocket wheels 19 which are connected by chain 20 in order that rotation, and corresponding movement of each end of channel lift assembly 12, may be uniform and synchronized. Alternative drive means of effecting rotation are possible. The form head housing 10 is shown with metal relieved in order to suggest to the practitioner that a worm gear drive in such an area will also suffice to rotate the threaded rods 11. If a worm gear drive is employed the chain sprocket wheels 19 would not be driving elements but would rather be driven elements utilized to transmit torque from the driven one of threaded rods 11 to the other one. Many means of effecting bi-rotational motion of threaded rods 11, including direct drive, will be obvious to a practitioner in the art. The resultant raising or lowering in the Z axis of channel lift assembly 12 raises and lowers adjuster knives 14 which allows form knives 13 to compress under spring pressure or forces form knives 13 apart under knife pressure.

The technique by which form knives 13 are evenly arrayed across that actual interval represented by the current workpiece ribbon cable 1 involves reference, normally a visual reference, to that cable. The rear, or 41st, one of form knives 13 is compressively held against the side of form head housing 10 and will not move under any spacing adjustment. Therefore either the last, or 120th, conductor or workpiece ribbon cable 1 can be positioned under this last one of form knives 13, or the entire form head housing 10 may be moved in the Y axis relative to a fixed workpiece until this alignment is obtained. A provision for controllably positioning the workpiece along the Y axis will be taught in conjuction with FIG. 3. With the last one of form knives 13 positionally correctly aligned over the corresponding last conductor of workpiece ribbon cable 1, the separation of form knives 13 is then adjusted by raising or lowering adjuster 14. When the first one of form knives 13 is accurately positionally aligned over the first conductor of workpiece ribbon cable 1, then all forty-one of form knives 13 will be at equal separations.

The precision in the equality of the separations obtained is a function of the uniformity of the tapered surfaces of form knives 13 and of adjuster knives 14. When each set of knives is cut from the same base stock the uniformity can be excellent and the equality of the intervals achieved can be much more precise than is required to reliably contact wires at an approximate spacing of 0.0045 inches. Indeed this technique has obvious applications for the mechanical determination of intervals within a variable length wherein some fraction or some fractions of the total length are to be physically determined with great precision. If the form knives 13 were sharply pointed at their heads, instead of blunt as besuits their present purpose, it is obvious that the total length between the first and last knife has been divided into forty parts, or intervals with considerable precision as demarked by such sharp points on the knife heads. Correspondingly, it is obvious that some one of modified form knives 13, say knife number 23, demarks twenty-three fortieths of the interval with the same considerable precision. There are obvious differences between the present technique and precise determination of an interval by measurement, or by the position of a follower along a precision screw which is rotated through a precise angle. In the first place, the present technique does not require measurement of the total interval—whether in units of distance or angular degrees of rotation of a precision screw—in order to intervalize and fractionate it. In the second place, several fractional intervals, not necessarily equal, can be simultaneously determined. In the third place, the present technique is subject to rapid, efficient, and accurate repetitive performance. Not only may variable intervals be readily divided, but the divisor may be altered dependent upon which number form knife (e.g. number 37, or 38, or 40, or 41) is used to demark the end of the interval. For large changes in interval or divisor substitute sets of knives would be used.

The unmeasured and variable length inteval divided and segmented by the meshing knife sets of the present invention need not only be a straight linear interval, but can be a curved length or even the circumference of a circle. In the case of intervalizing a circle, both adjuster knives 14 and form knives 13 will be circularly arrayed and equal in number.

The actual forming operation is the final step in the utilization of the present invention as is shown in FIG. 2. The entire form head housing 10 is depressed in order that form knives 13 will form the wire ends of ribbon cable 1 against form block 16. The external motive force which is capable of causing compressive movement is not shown in FIG. 2 but various alternatives including manual force and hydraulics are considered routine to a practitioner in the art. In FIG. 4 an air solenoid method for actuating this movement of the entire form head housing 10 will be shown.

Figures 3A, 3B, 3C:
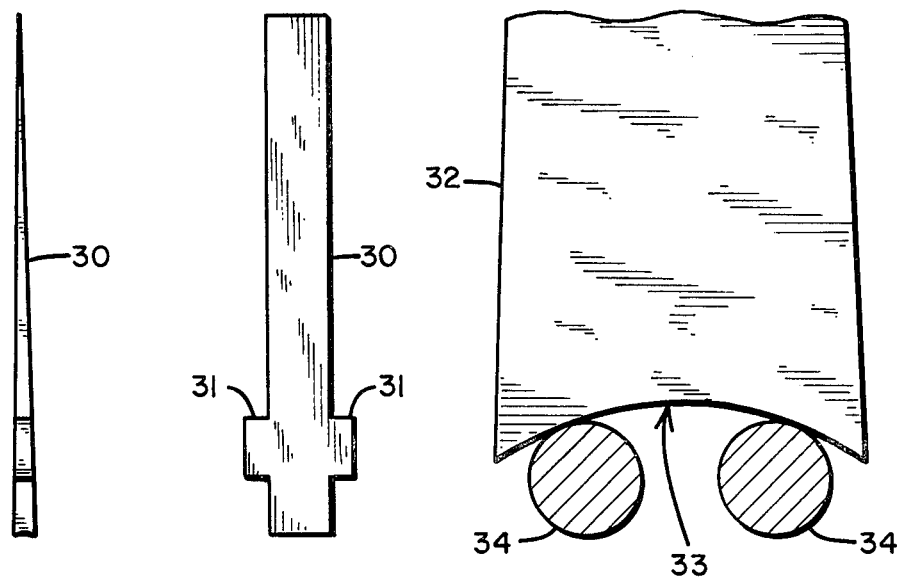
FIG. 3a shows a first side perspective of a form or justifier knife as is used in the ribbon cable form tool.
FIG. 3b shows a second side view of a form or justifier knife.
FIG. 3c shows, in much enlarged scale, the concave hammer head of a form knife contacting two conductors of the ribbon cable workpiece.

An improvement to the hammer head of form knives 13 in the present utilization is shown in FIG. 3c. The form knife 32 is shown with a circular concave head along the X axis, or direction of the formed wire. The nominal radius 33 of the circular arc is 0.020 inches such as could be formed by a #60 drill. The concave forming head enables the two contacted wires 34 to be most reliably contacted and bent, or formed, in the desired square edged contour.

Several variations on the forming operation are obvious. If any one(s) of form knives 13 has a truncated forming head—a forming head which is abbreviated to about the position of the tabs which maintain form knives 13 in channel lift assembly 12—then no contact will be made and no forming performed on the wire(s) underneath such placeholding but nonforming truncated form knives 13. If any one(s) of form knives 13 has a forming head aligned other than parallel to the X axis, and so mates with a correspondingly aligned seat(s) on form block 16, it is obvious that bent contours other than the approximate right angle form of FIG. 1b may be obtained. If any one(s) of the form knives 13 has a point or a die as a head it is possible to use the present apparatus for impressing marks across a width, as in the scribing of a rule, or to punch holes and the like at precision intervals. Most conventionally shaped stamping, punching, forming, scribing, and marking element heads are adaptable to the tapered element structure exhibited by form knives 13.

A semiautomated utilization of back to back ribbon cable forming tools, including the forming head and anvil forming block of FIG. 2 in conjunction with a ribbon cable holding and handling fixture, is shown in FIG. 4. This combination is capable of cutting, stripping, and end forming the multiconductors of flat ribon cable. The machine performs all three operations in one cycle. A small section of cable is removed, severing the ribbon cable. Both ends adjacent the removed section are stripped. Then both are formed. In other words the second end of a first cable is formed simultaneously with the first end of a second cable. All motions accomplished, as by No. 2,845,847 are relative to a rigid frame (not shown).

The sequence of operations may be manually controlled, or it is routine in the art to stepwise automatedly sequence the air cylinders as will effect the desired motions. The workpiece ribbon cable 1 is firstly placed into the open front cavity 41 of the machine until it abuts firmly against the back stops (notshown). In such position it is under the cut, strip and form head 42 which form head 42 is but an enlargement of, and rigidly contains, form head housing 10 previously seen in FIG. 2. A foot pedal (not shown) may be depressed to start a logical sequence of actuations of the several air cylinders as will be shown, or each actuation may be manually actuated. Firstly actuated are clamp air cylinders 43 which compressively force cable clamps 44 against both ends of ribbon cable 1 and hold it stationary. Secondly actuated is cut and strip air cylinder 45 which forces downwards the upper against the stationary lower cut knives 46. Note the small separation between the left and right set of cut knives 46 shown in FIG. 4 in order to observe that when ribbon cable 1 is cut a small section across the width of the cable is actually severed and is discarded as it falls away. Simultaneously with the cutting occurring from the actuation of cut and strip cylinder 45, the upper strip knives 47 are forced toward the lower so that they indent into the insulation of ribbon cable 1. These strip knives 47 stop against a deadman stop, which may be made adjustable by the practitioner so that best even penetration of the insulation is made.

Thirdly actuated are X axis slide cylinders 48 which force the entire left and right X axis slide assemblies 49 apart a set distance. Since ribbon cable 1 is still clamped between cable clamps 44 and X axis slide assmeblies 49, it is pulled through strip knives 47 and the insulation is removed from all conductors. Furthermore, X axis slide assemblies 49 stop their travel against limits when the stripped conductors are positioned between form blocks 50 and under the form knives 13 (shown in FIG. 3) of form head housing 10. Form blocks 16, 16 consists of two back-to-back form block 16, which was previously seen in FIG. 2.

Automated sequencing, if it has been employed, must pause at this point for manual adjustments prior to end forming. Of course, an automated sense and control circuit might be designed to perform the following observations and alignments but the teaching of such is beyond the scope of this specification disclosure. A first operation aligns the backside conductor of ribbon cable 40 under the last one of form knives 13 (shown in FIG. 3) part of form head housing 10 by turning Y axis knob 51, which is connected to a screw. This moves the entirety of X axis slide assemblies 49, cable clamps 44, and the now stripped ribbon cable 1 along the Y axis on Y axis slides 52. The operator may be aided in performing this alignment by an optical magnifying microscope, or by an optic fiber or the like. Note that this preferred embodiment need utilize only one Y axis adjustment for aligning the two cable ends as are held on the left and right sides because, recently having been severed from a single cable, these ends exhibit veritably identical spacing of contained conductors, and are held in clamps.

Next in manual adjustment, the front one of form knives 13 (shown in FIG. 3) is aligned over the first, front-most conductor of ribbon cable 40 by turning the form adjust knob 53. This form adjust knob 53 is equivalent in function to chain sprocket wheels 19 shown in FIG. 2—it serves to force the adjuster knives 14 into the form knives 13 and thusly vary their separation. All knives are justified over the conductors of ribbon cable 1 when this adjustment is made. The actual linkage by which a form adjust knob 53 may be side mounted for operator convenience yet control the threaded rods 11 as shown in FIG. 2 is a simple worm gear.

With the forming head 42, which rigidly incorporates form head housing 10 previously seen in FIG. 2, now justified over the wire ends of left and right parts of ribbon cable 1 the operator presses thumb button 54 near form adjust knob 53 to cause Z axis form cylinder 55, shown in outline only, and located behind cut and strip cylinder 45, to fourthly actuate and force the entire form head 42 down toward form blocks 50, forming the cable. Then the thumb button 54 is released, signalling the end of cycle. The Z axis component of form head 42 returns to its top position under control of Z axis form cylinder 55. The cable clamps 44 release ribbon cable 1 under the control of clamp cylinders 43. The X axis slide assemblies 49 return to their starting, close together, position under the control of X axis slide cylinders 48. The operator removes the formed cable ends from the machine and starts the entire process over upon emplacing a new section of ribbon cable 1 within the machine.

Figure 5:
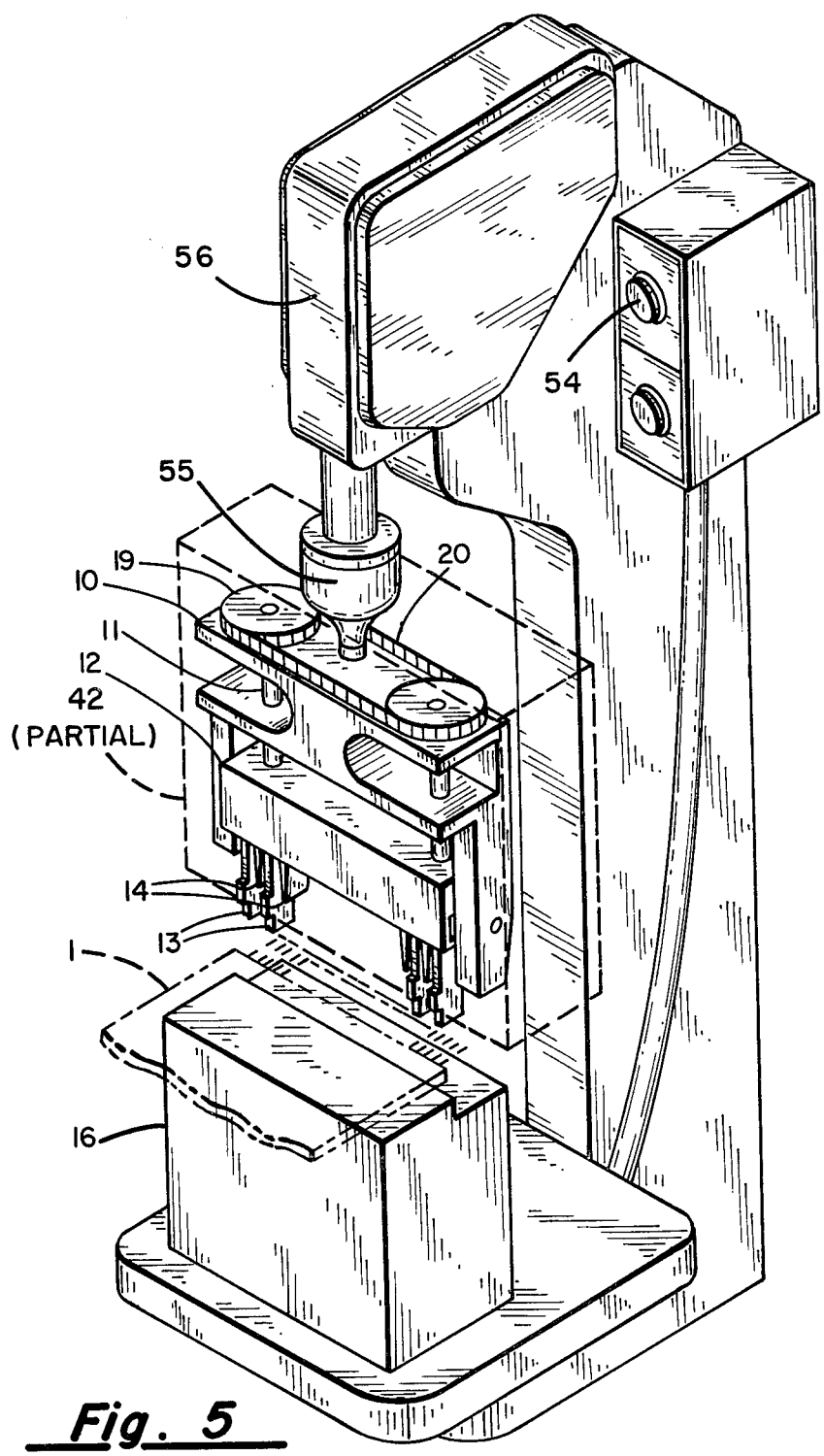
FIG. 5 shows a detailed representation of how the Z axis form cylinder, acting against a frame, may force the entire form head down toward the form block within the apparatus of FIG. 4, thereby forming the cable.

The manner by which Z axis form cylinder, operating against frame 56, does fourthly actuate and force on entire form head 42 down toward form blocks 16, 16, forming the cable, illustrated in FIG. 5. The form head 42, shown in FIG. 4, is shown in dashed line outline so that it may be recognized that the form head housing 10, previously seen in FIG. 2, is rigidly held therein. Only one-half of form head 42, which in the preferred embodiment of the invention shown in FIG. 4 contains two form head housing 10, is shown; the purpose of FIG. 5 being to particularly illustrate the manner of the forming operation. Likewise, many details of the strip knives 47, cut knives 46, cut and strip cylinder 45, and form adjust knob 53 are omitted from FIG. 5 as irrelevant to teaching the essential motion imparted to form head 42, and the manner of the forming operation. Likewise, many details of the strip knives 47, cut knives 46, cut and strip cylinder 45, and form adjust knob 53 are omitted from FIG. 5 as irrelevant to teaching the essential motion imparted to form head 42, and the form head housing 10 continued therein, by the Z axis form cylinder 55. Referencing FIG. 5, and identically as stated in previous paragraphs, the operator presses thumb button 54 to cause Z axis form cylinder 55 to fourthly actuate and, operating against frame 56, force the entire form head 42 (containing form head housing 10 rigidly mounted therein) (partially shown in FIG. 5) down toward form blocks 16, 16 (one half partially shown in FIG. 5), thereby forming the wire ends of cable 1. A preferred Z axis cylinder 55 is the BTM Corporation, 2145 Wadhams Rd., St. Clair, Mic. 48079 U.S.A., air powered toggle press model P-1-H with one ton pressing force and 0.5 inches (1.270 centimeters) stroke.

It is obvious that all sequential steps may be performed under manually switched control. The interconnect of switches to control mechanical motion as effectuated by solenoid valve air cylinders or the like is considered routine in the art. It is also obvious that certain staged operations of the present invention may be automatedly sequenced without departing from the true spirit of the operation and apparatus taught, that is, a method and tool for the rapid, repetitive and sequential cutting, stripping and wire end forming of a multiconductor ribbon cable.

What is claimed is:

1. A method of positionally interrelated time-stepped motions for cutting, stripping, and end-forming an insulated multi-wire flat workpiece ribbon cable which comprises:

clamping and holding said workpiece ribbon cable while in a first position; then end cutting said workpiece ribbon cable while still in said first position; and cutting and holding said insulation at a location back from said cut end of said workpiece ribbon cable while still in said first position; then stripping said cut and held insulation from said workpiece ribbon cable while pulling the stripped wire ends thereof to a second position between an anvil forming block and a forming head with a line-up plurality of hammer-headed forming elements; then aligning an edge one of said multiple wires within said workpiece ribbon cable under an end one of said plurality of lined-up hammer-headed forming elements; then responsively to the width of the individual one said workpiece ribbon cable subject to said clamping and holding, said end cutting, said cutting and holding, said stripping, and said aligning evenly justifying each and all remaining ones of said lined-up plurality of hammer-headed forming elements across said width of said individual one said workpiece ribbon cable in order that each and every one of said plurality of lined-up hammer-headed forming elements may be, by said justifying, better proximately juxtaposed oppositely the multiple wires of said multi-wire flat workpiece ribbon cable; then compressively forming said stripped wire ends by pressing said anvil forming block and said forming head together.

2. A method of positionally interrelated time-stepped motions for cutting, stripping and end-forming an insulated multi-wire flat workpiece ribbon cable which comprises:

clamping and holding said workpiece ribbon cable while still in said first position; then end cutting said workpiece ribbon cable while still in said first position; and cutting and holding said insulation at a location back from said cut end of said workpiece ribbon cable while still in said first position; then stripping said cut and held insulation from said workpiece ribbon cable while pulling the stripped wire ends thereof to a second position between an anvil forming block and a forming head with a lined-up plurality of hammer-headed forming elements; then aligning an edge one of said multiple wires within said workpiece ribbon cable under an end one of said plurality of line-up hammer-headed forming elements; then responsively to the width of the individual one of said workpiece ribbon cable which is being operated upon, evenly justifying each and all remaining ones of said lined-up plurality of hammer-headed forming elements across said width of said individual one said workpiece ribbon cable by evenly progressively forcing a plurality of lined-up separator knife elements as wedges between each of said plurality of hammer-headed forming elements so that said plurality of hammer-headed forming elements may be separated and until said plurality of wedge-separated lined-up hammer-headed forming elements subtend said width of said workpiece ribbon cable; then compressively forming said stripped wire ends by pressing said anvil forming block and said forming head together.

3. An apparatus for cutting, stripping, and forming ones of a multiplicity of wires at the end of a variable width multiconductor ribbon cable, which apparatus comprises:

a frame means;

fixed and moveable cut knife means carried by frame means, said moveable cut knife means being moveable relative to said support bed and frame means, for cutting across said workpiece ribbon cable;

fixed and moveable strip knife means adjacent said cut knife means and fixed thereto for stripping the insulation from said multiplicity of wires within said workpiece ribbon cable in order to produce a multiplicity of wire ends;

form block means attached to said frame means for providing an anvil surface under said multiplicity of wire ends;

forming head means moveably mounted on said frame means and carrying a plurality of $N+1$ justifiable hammer-headed forming elements over said multiplicity of wire ends within said workpiece ribbon cable, said forming means comprising:

(a) said plurality of $N+1$ hammer-headed forming elements each with a hammer-head on one end disposed toward said form block means and with a wedge upon the opposite end, the line of the edge of such wedge being lined-up approximately parallel to the length of said workpiece ribbon cable as held upon said support bed means;

(b) forming head frame means for maintaining said plurality of $N+1$ hammer-headed forming elements as a linear sequential array across said multiconductor ribbon cable and with the hammer-head of each of each of said $N+1$ hammer-headed forming elements disposed toward said form block means; and (c) a plurality of N separator knife means for wedging apart by being forced between the wedge ends of said plurality of $N+1$ hammer-headed forming elements maintained as a linear sequential array, each adjacent ones of all said plurality of $N+1$ hammer-headed forming elements until all said plurality of $N+1$ hammer-headed forming elements do precisely subtend said variable width of said multiconductor ribbon cable, thereby justifying said plurality of $N+1$ hammer-headed forming elements over said multiplicity of wire ends within said workpiece ribbon cable; and compression forming force means connected to said frame and said forming head for forcing said forming head means and said form block means together, therefore since said form block means are, during said providing, of fixed position relative to said support bed and frame means forcing said forming head means together toward said support bed and frame means with said workpiece ribbon cable fixedly held thereon, in order to, by said forcing, form said multiplicity of wire ends within said workpiece ribbon cable.

4. The apparatus of claim 3 wherein said forming head means further comprises:

forming head means being dynamically justified responsively to said variable width of said multiconductor cable through incorporating merging force means for controllably progressively jointly evenly moving said wedging plurality of N separator knife means between greater and lessor wedging apart of said plurality of $N+1$ hammer-headed forming elements in order that, at some degree of resultantly evenly wedged even separation, some ones of said plurality of $N+1$ hammer-headed forming elements are evenly justified across said variable width of said multiconductor ribbon cable;

thereby dynamically justifying, responsively to each said variable width of each said multiconductor cable, said plurality of $N+1$ hammer-headed forming elements over said multiplicity of wire ends within each said workpiece ribbon cable.

5. The apparatus of claim 3 wherein said support bed means further comprises:

clamping means in fixed relationship to said support bed and frame means for performing said holding of said workpiece ribbon cable by clamping; and said support bed having two axis slide means mounted on said frame for moving said held workpiece ribbon cable thereby providing the motive force by which said support bed moves relative to said cut knife means and said frame means.

* * * * *

UNITED STATES PATENT AND TRADEMARK OFFICE
CERTIFICATE OF CORRECTION

PATENT NO. : 4,476,905
DATED : October 16, 1984
INVENTOR(S) : Duane K. Maben

It is certified that error appears in the above—identified patent and that said Letters Patent are hereby corrected as shown below:

Column 11, between lines 26 and 27 insert paragraph -- support bed means slidably mounted on said frame means for fixedly holding said workpiece ribbon cable; -- .

Column 11, line 27, insert -- said -- after "by".

Signed and Sealed this

Sixth Day of August 1985

[SEAL]

Attest:

DONALD J. QUIGG

Attesting Officer

Acting Commissioner of Patents and Trademarks